Feb. 9, 1943.  W. D. DOOLEY  2,310,682
METHOD AND APPARATUS FOR SELECTING FERTILE FROM INFERTILE EGGS
Filed Oct. 10, 1939
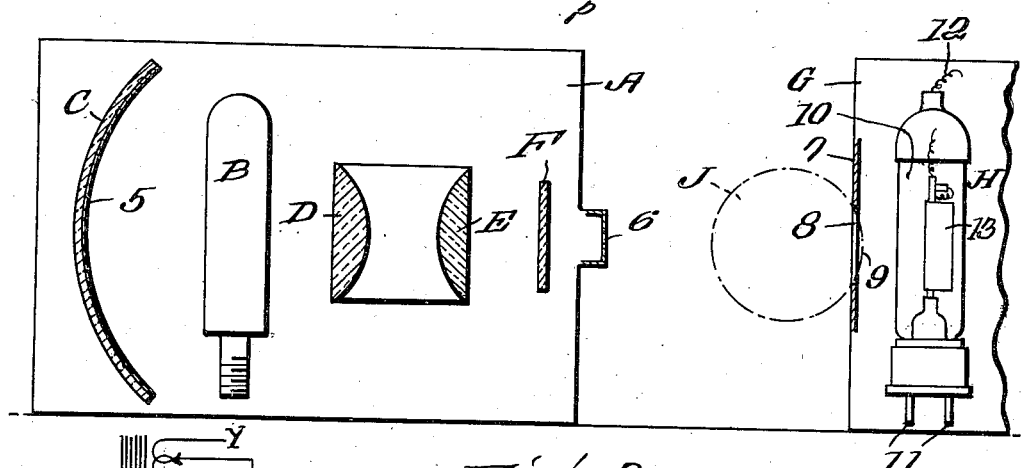
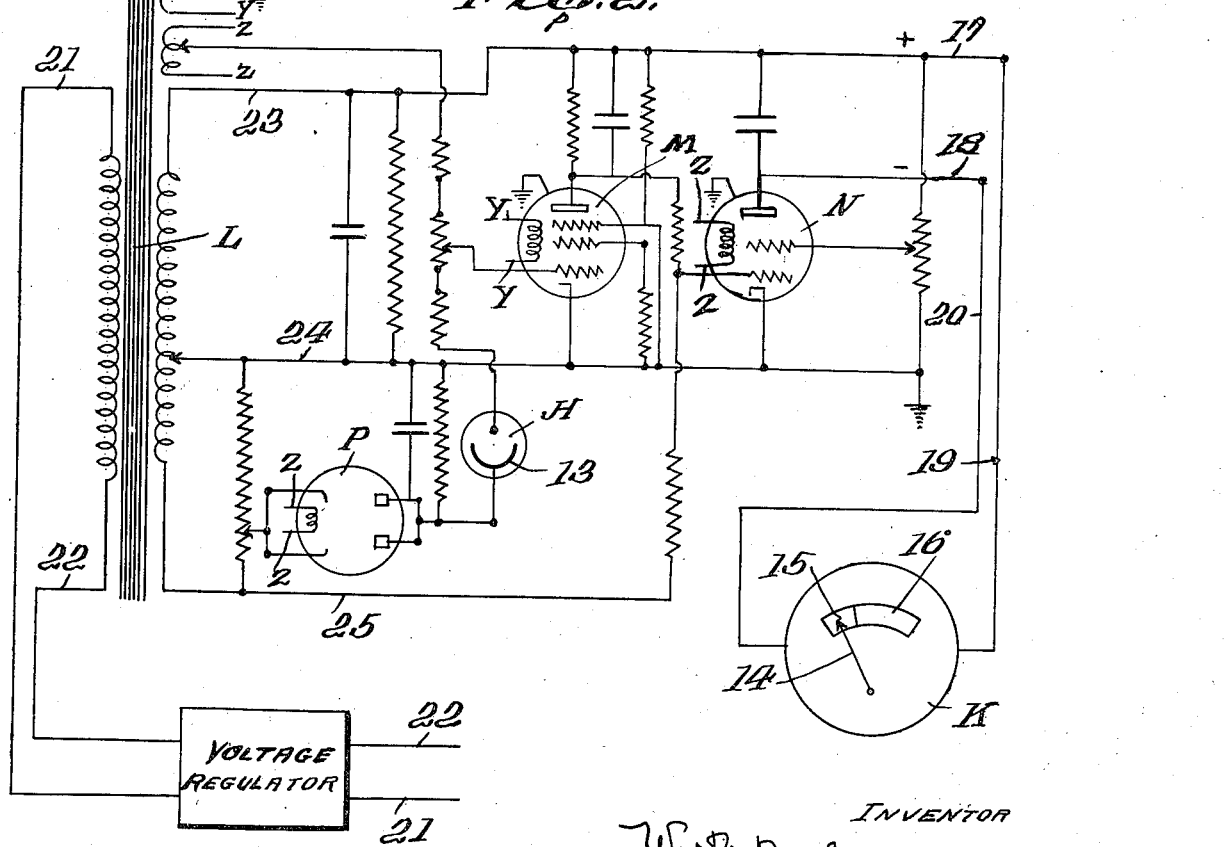
INVENTOR
W. D. Dooley
By Pattison, Wright & Pattison
ATTORNEYS Patented Feb. 9, 1943

2,310,682

UNITED STATES PATENT OFFICE 2,310,682

METHOD AND APPARATUS FOR SELECTING FERTILE FROM INFERTILE EGGS

William D. Dooley, Springfield, Ohio, assignor to Joseph B. Cartmell, Springfield, Ohio Application October 10, 1939, Serial No. 298,841

19 Claims. (Cl. 88—14.1)

Each year millions of eggs are subjected to artificial incubation by those who are in the poultry business or are in the business of raising "chicks." Those familiar with this industry well know that all eggs will not hatch but that only the fertile egg will hatch out into a chick. Accordingly many machines and methods have been devised in an effort to determine or select fertile from infertile eggs so that only the fertile eggs will be placed in the incubating machines.

I have found however that all methods to me known and in use have been exceedingly inefficient and inaccurate in their selection of fertile from infertile eggs. This inaccuracy reflects itself in an enormous loss to the hatcheries. Infertile eggs are incubated and of course are a total loss as there is no market for incubated eggs. There is a loss also due to the space taken up by the infertile eggs in the incubating machines which reduces the output of the machines. But most important of all is the fact that such methods and machines as are available for the purpose of determining fertile from infertile eggs can only be used after the egg or eggs have been subjected to a period of incubation varying from six to twenty-four hours, and even after subjecting eggs to this period of incubation the results are exceedingly inaccurate and the degree of error runs to high percentages. Even when infertile eggs can be selected the market value of the egg has been materially reduced due to the incubation to which it has been subjected, and as a matter of fact eggs which have been thus subjected to long hours of incubation should not be sold as food.

There is an extensive as well as a critical need for a method and apparatus which will unerringly select fertile from infertile eggs prior to the subjection of the eggs to any incubation whatever, and the primary object of the present invention is the provision of such a method and apparatus.

Incidental to the primary object of the invention is the provision of a method and apparatus which will have not only the foregoing attributes but one which is comparatively cheap of manufacture and operation and which is capable of performing the selecting or scanning operation on eggs in vast quantities at small cost.

In perfecting the present method and apparatus many specifically novel features of construction and modes of operation have been conceived and will hereinafter more clearly appear from the following description when read in the light of the accompanying drawing.

In the drawing, which illustrates only one of many possible constructions which the apparatus may take in carrying out and practicing the present improved method:

Figure 1 is a view in combined side elevation and vertical section schematically illustrating an apparatus, other than the electrical system, suitable for practicing the present method.

Figure 2 constitutes an electrical circuit layout utilized in practicing the method.

The provision of a method and apparatus for determining or selecting fertile from infertile eggs is not broadly new, but the method and principle utilized by me in the accomplishment of this result is one, so far as I am aware, which has never before been utilized notwithstanding the fact that the selectivity obtained is, I have found by repeated tests and use, one hundred percent accurate.

The most common method heretofore in use has been that which is ordinarily referred to as "candling" but this method has been found to be inaccurate and has the serious handicap of the requirement that the eggs must be subjected to prior incubation before the method can be used. I am familiar with many of the methods and machines now in use and know that in candling and examining white shelled eggs twelve hours of incubation of the egg is required, and that in respect to brown shelled eggs an even longer period of prior incubation is required. In these candling machines and methods and such other methods and machines as are in use, the fertility or infertility of the egg is determined by visual inspection of the egg while light is being projected through the egg. Such a method is therefore subject to error due to the eye fatigue of the person examining the eggs, plus the human element which enters by the necessity of the operator forming his own opinion of the fertility or infertility of the egg by reason of what he sees within the egg due to the light passing therethrough. The operator when practicing these methods is endeavoring to visually see whether or not there has been any germinal development or growth on the surface of the egg yolk. As mentioned this method has been found to be highly inaccurate in its results.

In carrying out my invention I have eliminated completely from the picture the human element in selecting the fertile from the infertile eggs and have eliminated all of the undesirable features present in prior methods and I also provide a method which operates with full efficiency and accuracy with eggs which have not been subjected to any prior incubation or heat treatment.

Broadly stated my method is that of determining the degree to which the interior contents of an egg are saturated with carbon dioxide gas, commonly referred to as $CO_2$ and preferably, but not necessarily, I accomplish this determination by spectroscopically analyzing the interior contents of the eggs.

By long and tedious experimentations I discovered that fertile eggs practice the process of metabolism while infertile or sterile eggs do not have this process. It is an established biological fact that any living mamalian or avian embryo that lives and will grow into its kind converts through respiration or metabolism the oxygen in the air to carbon dioxide. I have found that with respect to a newly or freshly laid egg, that is an egg which has been laid for a period of under six hours, both the fertile and the infertile eggs contain carbon dioxide gas. At or within this particular period the interior contents of a fertile egg will, at a minimum, be saturated with carbon dioxide gas to an extent or degree three times as great as the saturation of the contents of an infertile egg. Stated another way, the carbon dioxide saturation of an infertile egge during this period, or any later period for that matter, is never greater than seventy-five one-hundredths of one percent, and is usually much less, while the contents of the fertile egg are saturated to a degree or percentage at least three times that amount and to a much higher degree after the passage of six hours. Consequently the minimum ratio of carbon dioxide saturation of a fertile to an infertile egg is three to one. The percentages and ratios of saturation given above are in respect to the total volume area of the interior of the egg.

As my method operates upon the accurate determination of the degree or percentage of carbon dioxide gas within an egg by spectroscopic analysis I then determined that the wave length of $CO_2$ gas, that is the characteristic radiant energy wave absorption band of this gas, is 42,680 Angstrom units. Thereupon it became also desirable to provide a filter or screen which will pass energy waves only between 42,679 Angstrom units and 42,682 Angstrom units. The wave band passed by this filter is extremely narrow and the filter acts to pass only those waves within the characteristic absorption band of carbon dioxide gas.

Before describing in detail and specifically my method and apparatus it is to be explained and understood that the eggs tested are unincubated eggs which have been allowed to cool down to room temperature from the body temperature imparted to them by the hen and that preferably a period of six hours has been allowed to elapse from the time the eggs were laid.

Attention is also directed to the fact that the present method and apparatus can be utilized in classifying or sorting freshly laid eggs which have been in cold storage. With eggs of this kind it is impossible to immediately classify or sort them as fertile or sterile eggs due to the fact that the embryo within the fertile eggs when held below sixty degrees F. temperature, as would be the case in cold storage, remains in what might be described as a comatose state and that the rate of metabolism under these conditions is extremely low with a resultant very small amount of carbon dioxide gas present in the cold egg. However, I have found that if these cold eggs are allowed to remain in a room for twenty-four hours, at a temperature between sixty and seventy-five degrees F. that thereafter the fertile and infertile eggs can be readily selected one from the other by my method and apparatus. This is due to the fact that after the egg has assumed the room temperature the embryo assumes a normal unincubated metabolism which results in saturating the yolk and egg white with that normal percentage of carbon dioxide gas which I have found to be normal and consistently present in fertile eggs six hours after they have been newly laid.

Having described the principle and phenomena underlying my method and apparatus a more specific description thereof will now be given by reference to the accompanying drawing which illustrates one form of apparatus which I have found to be satisfactory in practice of the invention.

Having reference now to Fig. 1 of the drawing, A is a housing within which is disposed a constant light source B which can be but is not necessarily of the Tungsten filament type. It is necessary however that this light generate an abundance of radiant energy waves in the infrared region and particularly waves lying between 42,679 and 42,682 Angstrom units. C is a parabolic reflector having on its concave side or face an electrolytically deposited pure silver reflecting surface 5 which is preferably from three to five ten-thousandths of an inch thick. A pair of optical condensers are designated at D and E and are made from the best grade of Crown or Jena glass. A wave length filter is designated at F which has the particular attributes of passing only radiant energy having a wave length between 42,679 and 42,682 Angstrom units. The housing is provided with a light outlet opening designated at 6.

A second housing, designated at G is arranged in separated spaced relation to the first mentioned housing A and contains within it a photoelectric or radiant energy responsive cell designated as an entirety at H together with an amplifying and controlling circuit, illustrated in Fig. 2 of the drawing, the specific nature of which will be hereinafter described.

On its face or side 7 opposed to the light outlet opening 6 the housing G is provided with an opening 8 of a proper size to receive a portion of the side 9 of an egg J. The egg is illustrated in dotted lines in Fig. 1 of the drawing and is disposed with its long axis in a horizontal plane and extending transversely of the opening 8. The radiant energy responsive cell H is positioned within the housing immediately back of the egg J and the opening 8.

In operation the radiant energy waves generated by the constant light source B are projected towards the light outlet by the reflector C and pass through the condensers D and E which focus the filament of the light source on the egg. The waves prior to reaching the egg pass through the filter F with the result that only those waves in the wave band lying between 42,679 and 42,682 Angstrom units reach the egg and are projected therethrough and upon the radiant energy responsive cell or element H. The cell H operates to pass current in a manner well understood by those skilled in the art but has the peculiar and particular characteristic of and being peaked for response only to the wave band or radiant energy which is substantially identical with that of carbon dioxide gas as will hereinafter more fully appear. Thus it will be apparent that as the waves of radiant energy are projected through the egg the cell will be responsive thereto in inverse proportion to the degree that these waves are absorbed by the carbon dioxide gas within the egg. An infertile or sterile egg will absorb practically none of the radiant energy due to the practical total absence of any carbon dioxide gas within the egg and as a consequence the response by the cell will be considerable in amount, whereas although a fertile egg may not absorb the radiant energy one hundred percent it will absorb it to such a high degree that the response of the cell will be practically nil.

Therefore by the use of a galvanometer or some other suitable graduated gauge fertile eggs can be readily selected from infertile eggs.

However, the passage of current in the electric circuit permitted by the cell in all instances is very small and for practical uses must be amplified to actuate the galvanometer or other gauge. Accordingly I have provided a novel amplifying circuit, but before describing the same will describe the cell or element H.

The cell H is conventional in many respects. It has the usual evacuated glass envelope or bulb 10 and has within it an anode and a cathode which are electrically connected into the electric circuit by the prong contacts 11. The glass envelope however is constructed of a high grade Crown or Jena glass and is highly evacuated and filled with a small quantity of inert gas such as Argon, Xenon or Krypton. A gas fill of one part in one hundred has been found satisfactory. Additionally the element is provided with a current or electrical take-off 12 which is connected to the upper end of the cathode and is provided because the cell is being used in a highly sensitive circuit where the input resistance to the grid of the first amplifying or detector tube is in excess of five million ohms and it has been found that the insulating quality of the base by reason of the leakage between the elements terminating in the base would otherwise cause an unstable circuit and tend to cause the output of the amplifier to make a meter flutter when connected thereto.

By reference to Fig. 2 of the drawing it will be seen that the cathode or plate is designated at 13 and is semicylindrical in form. I have found that a cathode having nine-tenths of a square inch surface works very satisfactorily. Inasmuch as the cell is to be responsive for passing current only to waves of the specific absorption band of carbon dioxide gas it is necessary that the cathode be coated in a specified manner so as to cause the cell to be so peaked for operation. I have found a cathode coated with a solution of magnesium oxide, and caesium in equal quantities applied by baking and dehydrating to be highly satisfactory and to function in the manner desired and necessary.

At this point the specific nature of the light source might be well enlarged upon. No specific type of light is absolutely essential provided the light generates an abundance of radiant energy in the wave lengths of the absorption band of the carbon dioxide gas. I have found however that a General Electric T-10 projection lamp with a filament temperature of three thousand degrees Kelvin is very satisfactory.

The desirable characteristics of the reflector C might also be mentioned as being that the reflector will not appreciably absorb any of the long energy waves and that its reflecting surface will not become checked or marred due to contraction or expansion of the reflector.

Heretofore in the description it has been pointed out that the specific length of energy waves permitted to pass through the filter includes in the band energy waves slightly below and slightly above the specific absorption band of carbon dioxide gas. This wave band however is the fundamental absorption band of carbon dioxide gas and by its use there is a little more energy transfer obtained to operate on the radiant energy responsive cell than would be the case if the wave band were held specifically to 42,680 Angstrom units.

Detailed and specific wire by wire description of the electric circuit illustrated in Fig. 2 of the drawing is considered unnecessary as the circuit can be readily read by those skilled in the art. The circuit is an amplifying circuit for amplifying the current passed by the cell H so that the current will be of sufficient strength to actuate the needle 14 of a meter or galvanometer designated at K. The specific form and nature of this meter can vary but I have found a meter to be satisfactory where the dial is divided into two portions one of which is designated at 15 and the other at 16. When a fertile egg is under examination the absorption is so great as to cause the current passed by the cell or element to be so slight as not to move the needle off of the dial division 15 which division would be marked to indicate a fertile egg. On the other hand when an infertile or sterile egg is placed for examination the absorption thereof is practically nil with the result that a large current is passed by the cell which will cause the meter needle 14 to move over on to the dial division 16 which would be marked with indicia to indicate the infertile egg.

The meter or measuring device K is electrically connected to the output lines 17 and 18 of the amplifying circuit by the wires 19 and 20 respectively.

Referring now to the electric circuit illustrated in Fig. 2 of the drawing, L designates a transformer which is connected by input current supplying wires 21 and 22 to a 115 volt alternating current sixty cycle source of current supply and in said connection there is a voltage regulator which will control the input primary voltage to one-half of one percent plus or minus of 115 volts.

The radiant energy responsive cell has previously been described and its placement in the circuit is clearly illustrated. In the circuit three tubes M, N and P are utilized and I have found that tubes which are standard in radio use and which may be purchased in any radio store are satisfactory. The tube M is what is commonly referred to as a 6C6 tube; the tube N is commonly referred to as a 6L6 tube, and the tube P is commonly referred to as a 6H6 tube. The tubes N and P are connected to the transformer take-off leads Z—Z as is clearly illustrated while the tube M is connected to the transformer take-off Y—Y. 375 volts are imposed across the wires 23 and 24 and similarly 375 volts are imposed across the wires 24 and 25.

Although I have hereinbefore stated that the cell is responsive only to radiant energy within a stated wave band or length those skilled in the art will recognize that this is not literally an accurate statement. Actually the cell will weakly respond to wave lengths other than those specified but the cell is peaked for maximum response to the specified wave length and its response to the other wave lengths is so weak as to be inconsequential.

It is to be understood that the apparatus can be varied to accomplish and practice the method of the present invention without departing from the spirit thereof.

The provision and use of the wave length filter F is not essential to the operation of the invention. This filter is provided to safeguard the radiant energy responsive cell H the life of which would be detrimentally affected were the full spectrum of energy generated by the light source allowed to fall upon the cell for any appreciable length of time either by steady duration or by accumulated duration. With the apparatus illustrated it would be possible in the absence of the filter for the operator to leave the light on when no egg is interposed between the light and the cell. Additionally the full spectrum of light would fall upon the cell each time an egg is removed and another deposited for test.

From the foregoing it will be seen that I have provided a method and apparatus having all of the attributes before recited and which is infallible in its selection of fertile from infertile eggs and which overcomes the disadvantages inherently present in methods and machines by which the selection of the eggs is made by the use of the human eye or other human instrumentality.

The invention is to be limited only within the scope of the hereinafter appended claims.

I claim:

1. The method of determining a fertile from an infertile egg without breaking or impairing the egg in any regard whatsoever, consisting in projecting through a representative cross section of said egg radiant energy of that wave length which will be absorbed by carbon dioxide gas, determining the degree to which the interior contents of said egg lying within said cross section are saturated with carbon dioxide gas by ascertaining the degree of absorption of said energy by said interior content portion of said egg, and comparing said finding with a similar finding in respect to the carbon dioxide saturation within an infertile egg.

2. The method of determining a fertile from an infertile egg without subjecting said egg to incubation and without breaking or impairing the egg in any regard whatsoever, consisting in projecting through a representative cross section of said egg radiant energy of that wave length which will be absorbed by carbon dioxide gas, determining the degree to which the interior contents of said egg lying within said cross section are saturated with carbon dioxide gas by ascertaining the degree of absorption of said energy by said interior content portion of said egg, and comparing said finding with a similar finding in respect to the carbon dioxide saturation within an infertile egg.

3. The method of determining a fertile from an infertile egg without breaking or impairing the egg in any regard whatsoever, consisting in projecting through a representative cross section of said egg radiant energy including waves of a length lying between 42,679 and 42,682 Angstrom units, determining the degree to which the interior contents of said egg lying within said cross section are saturated with carbon dioxide gas by ascertaining the degree of absorption of said specified energy by said interior content portion of said egg, and comparing said finding with a similar finding in respect to the carbon dioxide saturation within an infertile egg.

4. The method of determining a fertile from an infertile egg without breaking or impairing the egg in any regard whatsoever, consisting in projecting through a representative cross section of said egg radiant energy of that wave length which will be absorbed by carbon dioxide gas, and determining whether the interior contents of said egg lying within said cross section are saturated with carbon dioxide gas to an extent greater or less than 75/100ths of 1% of the total volume of said cross section by ascertaining the degree of absorption of said energy by said interior content portion of said egg.

5. The method of determining a fertile from an infertile egg without breaking or impairing the egg in any regard whatsoever, consisting in projecting through a representative cross section of said egg radiant energy of that wave length which will be absorbed by carbon dioxide gas, and then determining whether the interior contents of said egg lying within said cross section are saturated with carbon dioxide gas to an extent greater or less than three times as great as would be found within an infertile egg by ascertaining the degree of absorption of said energy by said interior content portion of said egg.

6. The method of determining a fertile from an infertile egg without breaking or impairing the egg in any regard whatsoever, consisting in projecting through a representative cross section of said egg radiant energy of that wave length which will be absorbed by carbon dioxide gas, determining the degree to which the interior contents of said egg lying within said cross section are saturated with carbon dioxide gas by ascertaining the degree of absorption of said energy by said interior content portion of said egg, and comparing said finding with a similar finding in respect to the carbon dioxide saturation within an infertile egg to ascertain whether or not said saturation is three times as great as the saturation within an infertile egg.

7. The method of selecting a fertile from an infertile egg without breaking or impairing the egg in any respect whatsoever, which includes the step of determining the degree by volume to which the interior contents of said egg are saturated with carbon dioxide gas, and comparing said finding with the carbon dioxide saturation of an infertile egg.

8. The method of selecting a fertile from an infertile egg which has not been subjected to incubation and without breaking or impairing the egg in any respect whatsoever, which includes the step of determining the degree by volume to which the interior contents of said egg are saturated with carbon dioxide gas, and comparing said finding with the carbon dioxide saturation of an infertile egg.

9. The method of selecting a fertile from an infertile egg without breaking or impairing the egg in any respect whatsoever, which includes the step of ascertaining by spectroscopic analysis the degree by volume to which the interior contents of an egg are saturated with carbon dioxide gas and comparing said finding with the carbon dioxide saturation of an infertile egg.

10. The method of selecting a fertile from an infertile egg without breaking or impairing the egg in any respect whatsoever, which includes the step of ascertaining by spectrum absorption analysis the degree by volume to which the interior contents of an egg are saturated with carbon dioxide gas and comparing said finding with the carbon dioxide saturation of an infertile egg.

11. The method of selecting a fertile from an infertile egg without breaking or impairing the egg in any respect whatsoever, which includes the step of determining whether the interior contents of said egg by volume are saturated with carbon dioxide gas to a greater or lesser amount than ¾ of 1%.

12. A method such as defined in claim 11 wherein, the carbon dioxide saturation is determined by spectroscopic analysis.

13. A method such as defined in claim 11 wherein, said carbon dioxide saturation is determined by spectrum absorption analysis.

14. The method of selecting a fertile from an infertile egg without breaking or impairing the egg in any respect whatsoever, consisting in the steps of projecting upon one side of the egg radiant energy comprising waves having the same length as the absorption wave length of carbon dioxide gas and then comparing with a known standard by electrical means which are subjected and responsive to the radiant energy waves which have passed through said egg the degree by volume to which the interior contents of said egg are saturated with carbon dioxide gas.

15. The method of selecting a fertile from an infertile egg without breaking or impairing the egg in any respect whatsoever, consisting in providing a radiant energy source which emits an abundance of radiant energy waves in the wave band lying between 42,679 and 42,682 Angstrom units, filtering said waves to permit the passage of only those waves lying within said specific wave band, projecting said filtered waves through the egg, determining the degree by volume of the absorption of said waves by the interior contents of the egg, and then comparing said absorption finding with a known standard to thereby ascertain whether said egg is fertile or infertile.

16. The method of selecting a fertile from an infertile egg without breaking or impairing the egg in any respect whatsoever, consisting in providing a source of radiant energy which emits an abundance of radiant energy waves in the wave band lying between 42,679 and 42,682 Angstrom units, propecting said energy waves through the egg, providing an electrical circuit having a current imposed thereon, providing in said circuit a radiant energy responsive element positioned to receive and be activated by the energy waves which pass through said egg, peaking said element for response to said specific wave band of radiant energy, causing said radiant energy responsive element to permit the passage of current in said circuit only when said element is activated, providing indicating means operable by the current permitted to pass through said circuit by said element, and calibrating said instrument with a known standard so that said instrument will indicate whether the egg is fertile or infertile.

17. An apparatus for selecting a fertile from an infertile egg without breaking or impairing the egg in any respect whatever by determining the degree by volume to which the interior contents of said egg are saturated with carbon dioxide gas, comprising a radiant energy source capable of emitting radiant energy an abundance of which is within the absorption band of said gas, means for projecting said energy from said supply source through an egg, an electric circuit and a source of current supply therefor, a radiant energy responsive element adapted to be activated by the radiant energy waves within the absorption band of carbon dioxide gas and substantially unresponsive to radiant energy waves outside of said band, said element being positioned to receive the unabsorbed radiant energy waves which pass through the egg and being electrically connected in said circuit and acting to permit the passage of current therethrough only when said element is activated, indicating means operatively connected with said circuit and operable when current is permitted to pass through said circuit, and said indicating means being calibrated in respect to a known standard so as to indicate whether an egg under examination by the apparatus is fertile or infertile.

18. A construction such as defined in claim 17 wherein, a light filter is interposed between the supply source of radiant energy and the egg and will permit passage to the egg of only those radiant energy waves corresponding closely in length to the length of those waves within the absorption band of carbon dioxide gas.

19. The method of determining in respect to an egg which is held in cold storage a fertile from an infertile egg without breaking or impairing the egg in any respect whatsoever, consisting in removing said egg from cold storage and holding the same for approximately 24 hours at a temperature of between 60 and 70° F., thereafter projecting through a representative cross section of said egg radiant energy of that wave length which will be absorbed by carbon dioxide gas, determining the degree to which the interior contents of said egg lying within said cross section are saturated with carbon dioxide gas by ascertaining the degree of absorption of said energy by said interior content portion of said egg, and comparing said finding with known standards of carbon dioxide saturation of fertile and infertile eggs.

WILLIAM D. DOOLEY.